E. R. FERRY, OF NEW HAVEN, CONNECTICUT.

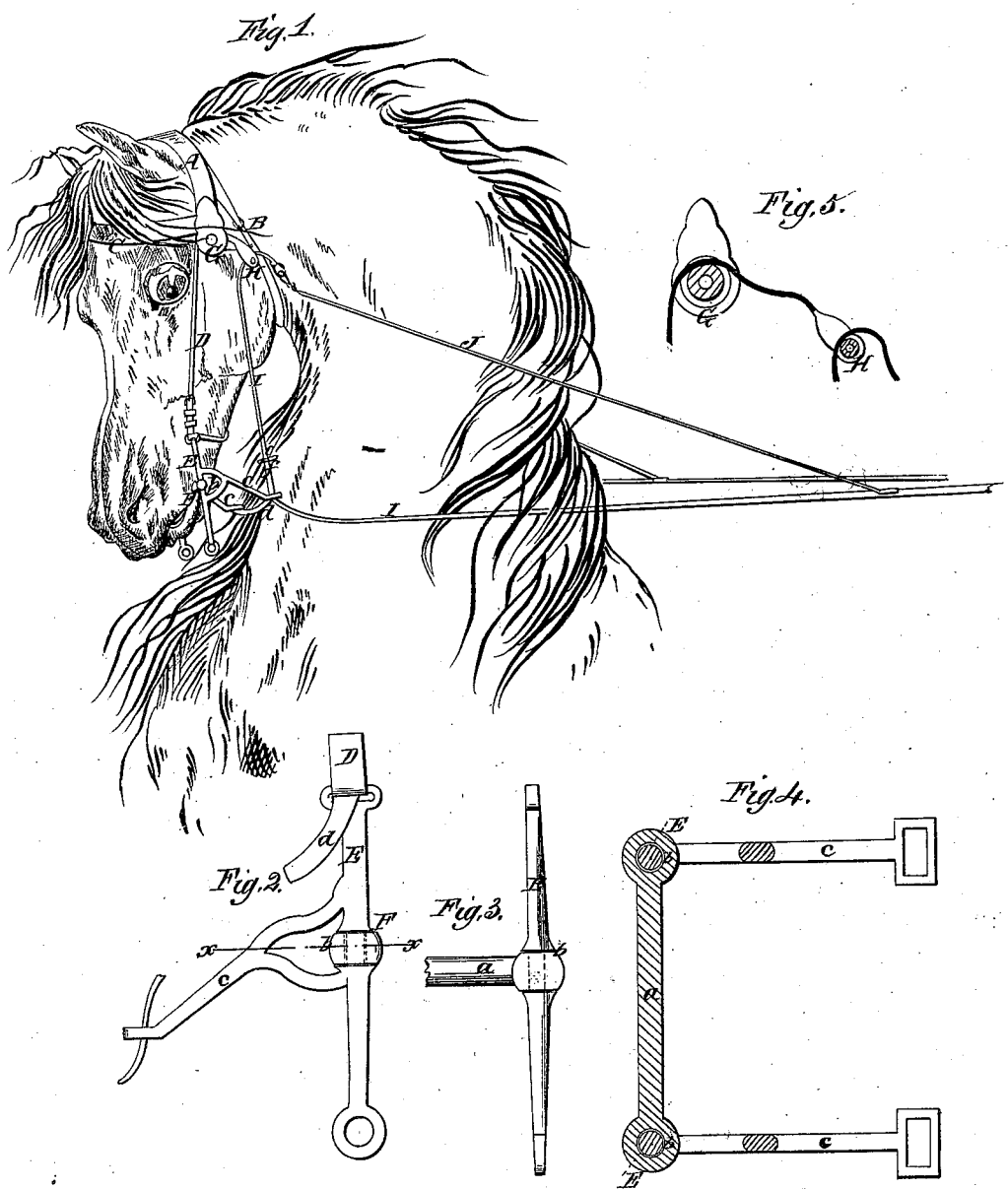

*Letters Patent No. 83,055, dated October 13, 1868.*

IMPROVED SAFETY-BRIDLE.

The Schedule referred to in these Letters Patent and making part of the same.

*To all whom it may concern:*

Be it known that I, E. R. FERRY, of New Haven, in the county of New Haven, and State of Connecticut, have invented a new and improved Safety-Bridle; and I do hereby declare that the following is a full, clear, and exact description thereof, which will enable those skilled in the art to make and use the same, reference being had to the accompanying drawings, forming part of this specification.

This invention relates to a new and useful improvement in that class of bridles in which, by the pulling of the reins, the bit is drawn upward into the angle of the horse's mouth.

The invention consists in a peculiar construction of the bit, and the arrangement of the driving and check-reins, as hereinafter fully shown and described, whereby certain advantages are obtained, which will be hereinafter set forth.

In the accompanying sheet of drawings—

Figure 1 represents a side view of my invention, applied to a horse.

Figure 2, an enlarged and detached side view of the bit.

Figure 3, an edge view of one side of the same.

Figure 4, a horizontal section of the same, taken in the line $x\ x$, fig. 2.

Similar letters of reference indicate corresponding parts.

A represents the head-band;

B, the throat-latch; and

C, the brow-band of the bridle.

D represents one of the check-straps, the other, at the opposite side of the bridle, being precisely the same as the one shown.

The lower ends of these check-straps are attached to the upper ends of the check-bars E of the bit F, and the upper ends of the check-straps pass through small sheaves G attached to the lower ends of the head-band A, and the upper ends of the check-straps have small sheaves H attached, as shown clearly in fig. 1.

The bit F is composed of a bar, $a$, jointed or otherwise, and the check-bars E are secured to the ends of the bar $a$ by joints $b$, said bars E having each an arm, $c$, projecting from them toward the neck or body of the horse.

The joint-connections $b$ admit of the arms $c$ working laterally in either direction, and the outer ends of said arms are connected by a strap, $d$.

I represents the driving-reins, which pass through eyes in the outer ends of the arms $c\ c$, and, extending upward, pass through the sheaves G at the upper ends of the check-straps D.

J is the check-rein, attached by snap-hooks $e$ to the driving-reins, as shown clearly in fig. 1.

On the driving-reins, above the arms $c$ of the bit, there are attached stops $f$, the use of which will be presently shown.

From the above description, it will be seen that by pulling on the driving-reins I, the bit will be drawn upward in the horse's mouth, this result being due to the arrangement of the check-straps, check and driving-reins.

This drawing-up movement of the bit is limited by the stops $f$, and these may be placed higher or lower, as circumstances may require, said stops preventing the bar $a$ of the bit being drawn upward sufficiently hard to injure the mouth of the horse.

The arms $c\ c$, in consequence of being connected to the ends of the bar $a$ by joints $b$, admit of either rein being pulled, to guide the horse, without causing the check-bars to be pressed against the side of the horse's mouth, a result which always takes place, in a greater or less degree. With the usual rigidly-attached check-bars, and with the arms $c\ c$ connected to the check-bars, as in my improvement, a rigid connection of the check-bars to the bar $a$ of the bit would be attended with worse consequences than usual. Hence the necessity of the swivel or jointed connection.

In case at any time a rigid or unyielding check-rein should be required, the rein J may be detached from the reins I, and an ordinary check-rein attached to the ends of the driving-reins I near the sheaves H, the check-rein passing around the check-rein hook on the harness of the saddle, as usual.

The arms $c\ c$ serve as levers to press a strap, $g$, which is attached to the upper ends of the check-bars, and which passes around the under side of the jaw, against said jaw. This renders the action of the bit very efficient in controlling the horse.

I do not claim broadly the arms or levers $c\ c$, nor the strap $g$, for they have been previously used; but I do claim as new, and desire to secure by Letters Patent—

1. The check-bars E E, provided with the levers $c\ c$, for the passage of the driving-reins, when connected to the bar $a$ by the swivel-joint $b$, whereby either rein is adapted to be pulled to guide the horse, without pressing the check-bars against the sides of his mouth, as herein shown and described.

2. The combination of the detachable check-rein J with the driving-reins I, when said parts are used in connection, or applied with the check-straps D D and the bit F, all arranged substantially as and for the purpose specified.

E. R. FERRY.

Witnesses:
 I. SIMMONS,
 P. FERRY.